A. AND M. BERSTED.
BALANCE WEIGHT COVER SUPPORT FOR PHONOGRAPHS.
APPLICATION FILED FEB. 5, 1921.
1,392,290.
Patented Oct. 4, 1921.
2 SHEETS—SHEET 1.
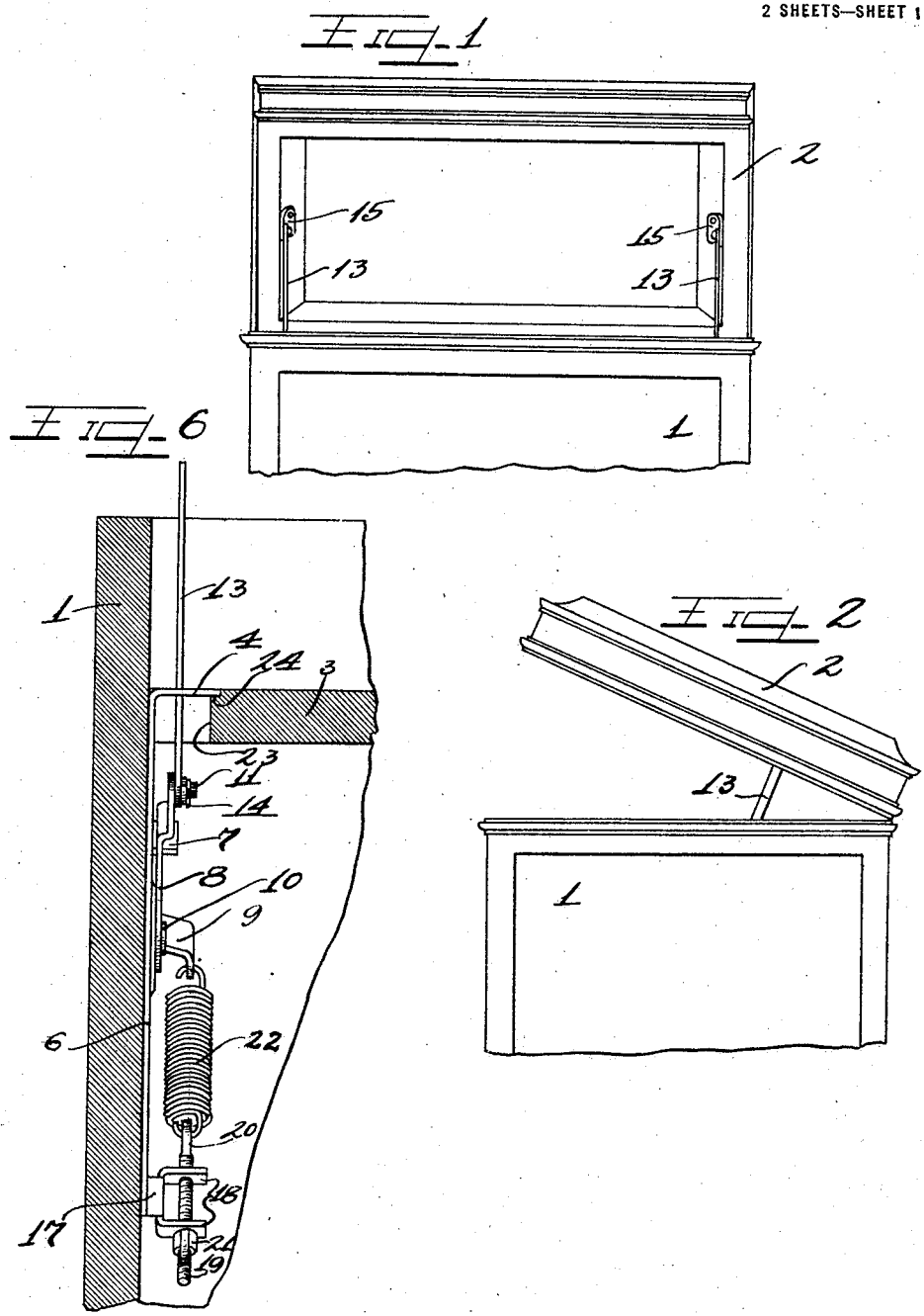

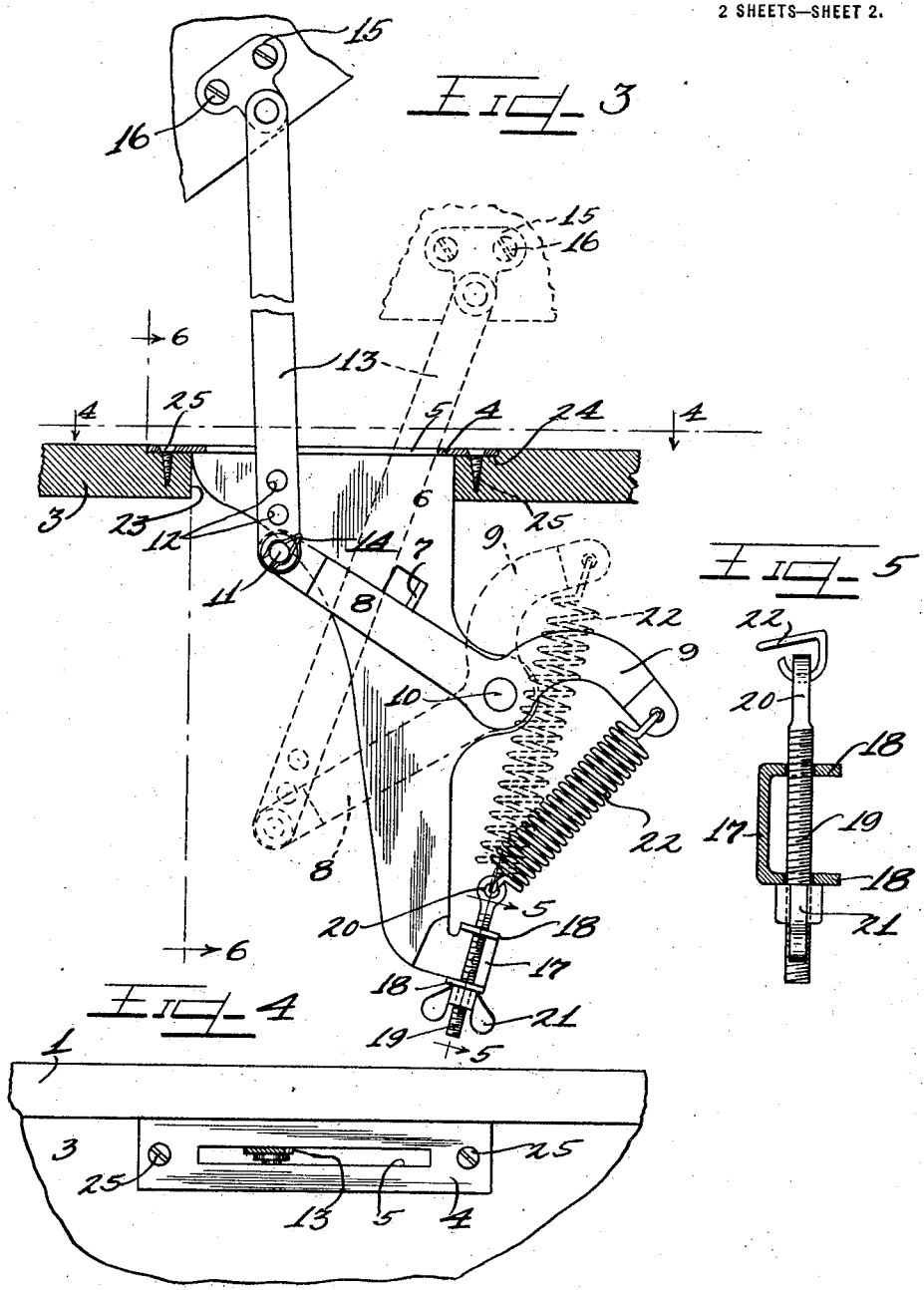

UNITED STATES PATENT OFFICE.

ALFRED BERSTED AND MARTIN BERSTED, OF CHICAGO, ILLINOIS.

BALANCE-WEIGHT COVER-SUPPORT FOR PHONOGRAPHS.

1,392,290.  Specification of Letters Patent.  Patented Oct. 4, 1921.

Application filed February 5, 1921. Serial No. 442,693.

*To all whom it may concern:*

Be it known that we, ALFRED BERSTED and MARTIN BERSTED, citizens of the United States, and residents of the city of Chicago, in the county of Cook and State of Illinois, have invented certain new and useful Improvements in a Balance-Weight Cover-Support for Phonographs; and we do hereby declare that the following is a full, clear, and exact description of the same, reference being had to the accompanying drawings, and to the numerals of reference marked thereon, which form a part of this specification.

This invention pertains to an improved type of a phonograph cover supporting mechanism adapted to hold the cover balanced in any desired position of adjustment and further adapted to be removed from the phonograph to permit adjustment of the control spring.

It is an object of this invention to provide a phonograph cover supporting mechanism adapted to be readily removed to permit adjustment thereof.

Another object of the invention is to construct cover supporting mechanisms adapted to be connected to both sides of a phonograph cover.

It is a further object of this invention to provide a phonograph cover support adapted to be supported on a mounting board of a phonograph and connected to the phonograph cover to hold said cover balanced in open position, said support adapted to be readily withdrawn from the phonograph to permit adjustment of a control spring of the support.

It is also an object of the invention to provide a phonograph with a cover supporting mechanism which is adapted to be projected through an opening in the phonograph motor board and connected to the phonograph cover to hold said cover balanced in open position, said mechanism being adapted to be withdrawn through said motor board opening to permit adjustment of the mechanism.

It is an important object of this invention to provide a casing cover support of simple and effective construction wherein the adjusting mechanism is normally inclosed by the casing below a casing board but is adapted to be adjusted by drawing the support upwardly out of an opening in said board when adjustment is necessary.

Other and further important objects of this invention will be apparent from the disclosures in the specification and drawings.

The invention (in a preferred form) is shown in the drawings and hereinafter more fully described.

On the drawings:

Figure 1 is a front elevation of the upper portion of a phonograph cabinet the cover of which is held balanced in an adjusted open position by cover supports embodying the principles of this invention.

Fig. 2 is a side elevation thereof.

Fig. 3 is an enlarged side elevation of the device showing the operation in dotted lines and further disclosing fragmentary parts of the phonograph cabinet and its cover.

Fig. 4 is a top plan view taken on line 4—4 of Fig. 3.

Fig. 5 is an enlarged detail section taken on line 5—5 of Fig. 3 showing parts in elevation.

Fig. 6 is a sectional view taken on line 6—6 of Fig. 3.

As shown on the drawings:

The reference numeral 1 indicates a phonograph casing or cabinet provided with a cover 2 hingedly connected to the upper end of the rear wall of the cabinet. Mounted in the upper portion of the cabinet 1 is a horizontal motor board 3. To prevent warping of the cover 2 as frequently occurs in cabinets where only one side of the cover is supported by a stay bar, the cover of the cabinet illustrated is provided with two oppositely disposed supporting devices connected with both sides of the cover.

Each supporting device is complete in itself and comprises a top plate or mounting flange 4 provided with screw apertures and with a longitudinal slot 5. Integrally formed at right angles to one side margin of the top plate 4 is a side or mounting plate 6 having struck therefrom a stop lug 7 for limiting the upward movement of an arm 8 of a fulcrum bell-crank member having a curved arm 9 integral with the straight arm 8. The bell-crank member 8—9 is pivotally mounted on the mounting plate 6 by means of a pin 10. The outer end of the arm 8 has a grooved pin 11 formed thereon adapted to be projected through any one of a plurality of apertures 12 in the lower or inner end of a stay bar 13. A hair pin clip 14 or any other suitable means may be engaged on the pin 11 to hold the stay bar in position. The stay bar 13 projects through the flange slot 5 and has pivotally secured on the upper or outer end thereof an apertured attaching plate 15 which is adapted to be secured to the inner surface of one of the cover sides by screws 16, as illustrated in Fig. 3.

Integrally formed on the lower end of the mounting plate 6 is an arm extension 17 provided with a pair of oppositely disposed flanges 18 having openings therein. Projecting through the flanges 18 is an adjusting screw 19 having an eye head 20 integrally formed on the upper end thereof. A wing nut 21 is threaded on the other end of the screw 19 to the outside of one of the flanges 18. Engaged in the screw eye 20 is one end of a coiled control spring 22, the other end of which is hooked in an aperture provided in the end of the curved bell-crank arm 9.

The operation is as follows:

As disclosed in Fig. 1, the phonograph cabinet is equipped with two balance weight supports which are connected to the opposite sides of the cover 2 to obviate any tendency of warping of the cover which very often occurs in cases where only one side of a cover is provided with a support.

Each side of the cabinet motor board 3 is provided with a slot or opening 23. Attention is called to the fact that in mounting or removing the cover supports it is not necessary to remove the cabinet mounting board from the phonograph cabinet.

Before mounting a cover support the wing nut is adjusted on the screw 19 to adjust the tension of the control spring 22. To mount a cover support in place the plate 6 is projected downwardly through one of the mounting board slots 23 and the supporting flange 4 is seated in a recess 24 of the mounting board to close the slot 23. Screws 25 are used to removably secure the flange 4 in place with the upper surface thereof flush with the top surface of the cabinet board 3. The attaching plate 15 is secured on the inner surface of one of the side walls of the cover 2 by screws 16 or other suitable means.

The tendency of the control spring 22 is to pull downwardly on the bell-crank arm 9 thereby causing upward movement of the arm 8 to raise the stay bar 13. The weight of the cover 2, however, acts to counterbalance the action of the spring 22 thus preventing any relative movement of the cover by the spring when the latter is properly adjusted. With the above arrangement the cover 2 may be raised manually to any desired position of adjustment, and is held balanced in said open position by the spring 22 which is tensioned to offset the weight of the cover. Both sides of the cover 2 are provided with balance supports thereby equally sustaining both sides of the cover in place to prevent any tendency of the cover to twist or warp out of shape.

The length of the stay bar 13 may be changed by simply removing the hair pin clip 14 from the pin 11. When this is done the apertured end of the stay bar may be removed from the pin to permit the pin 11 to be engaged in another one of the stay bar apertures 12.

The upward movement of the cabinet cover 2 is limited by the bell-crank arm 8 striking against the stop 7. When the cover 2 is lowered the control spring 22 approaches the pivot pin 10 or a dead center position but is not permitted to pass the dead center position for the reason that the cover is completely closed before the dead center position is reached, as illustrated in dotted lines in Fig. 3. This arrangement is very desirable for the reason that the cover when approaching its closed position is not permitted to close with a snap which would occur if the spring 22 were permitted to pass dead center. The fingers of a person lowering the cover 2 are therefore not in danger of being pinched between the cover and the cabinet which frequently occurs in constructions where the springs are permitted to pass a dead center position.

In case the spring becomes weak and does not properly hold the cover in a balanced open position of adjustment the spring may be adjusted or tensioned by simply removing the retaining screws 25 and lifting the entire supporting mechanism through the board opening 23. The wing nut 21 may now be turned any desired amount to cause tensioning or adjustment of the spring 22 to effect proper balancing of the cover.

In this invention it is not necessary to remove the phonograph motor board 3 from the cabinet 1 in order to get at the adjusting screw mechanism 19—21 to effect an adjustment of the spring 22.

We are aware that numerous details of construction may be varied through a wide range without departing from the principles of this invention, and we therefore do not purpose limiting the patent granted otherwise than necessitated by the prior art.

We claim as our invention:

1. The combination with a phonograph cabinet motor board and a phonograph cover, of balance cover supports projecting through the motor board and connected with the cover, and adjusting means forming a part of said cover supports adapted to be adjusted by withdrawing the supports through the motor board.

2. The combination with a phonograph cabinet, and the slotted motor board and cover thereof, of a balance weight device for the cover comprising a mounting plate adapted to be projected through said slotted board, a supporting flange integrally formed on said plate and secured to said board to close the slot therein, said supporting flange having a slot therein, a stay bar projecting through said flange slot and pivotally connected to the cover, a bell-crank member pivotally mounted on said mounting plate, one end of said bell-crank member pivotally connected with the stay bar, a spring connected to the other end of the bell-crank member, an adjusting screw engaged with said spring, apertured flanges on said mounting plate supporting said screw, and means threaded on said screw adapted to be adjusted to vary the tension of said spring.

3. The combination with a casing having a slotted board therein, of a cover mounted on said casing, a slotted flange plate for closing the slot in said board, a mounting plate integral with said flange plate and projecting through the board slot, a stop formed on said mounting plate, a member fulcrumed on said mounting plate adapted to be limited in its upward movement by said stop, a stay bar pivotally connected to one end of said fulcrumed member and projecting upwardly through said slotted flange plate and connected to said cover, an extension formed on the mounting plate, apertured flanges thereon, a screw eye projecting through said apertured flanges, a control spring connected to the eye end of said screw eye and to said fulcrumed member, and a nut adjustably engaged on the other end of said screw eye adapted to be operated to cause adjustment of the spring to balance the cover, said nut adapted to be adjusted by removing the mounting plate from the mounting board.

4. The combination with a cabinet having a board therein, said board having a slot, a cover on the cabinet, a spring controlled mechanism projecting through said slot and supported by said board, a stay member pivotally connected to said cover and to said mechanism, and adjusting means forming a part of said mechanism, said mechanism adapted to be withdrawn from the cabinet through said board slot to afford access to said adjusting means.

5. A balance weight cover support for phonographs comprising a plate, a slotted flange formed thereon for mounting the plate, a bell-crank member pivotally mounted on said plate, a spring connected to one end of said bell-crank member, and adjusting mechanism for said spring supported on said plate and connected to the other end of said spring, a stop on said plate for limiting the movement of said bell-crank member, a stay bar pivotally connected to the second end of said bell-crank member and projecting through the slotted flange, and an attaching plate pivotally connected to the projecting end of said stay bar to permit attachment thereof to a phonograph cover.

6. In a phonograph cabinet, a motor board and a hinged cover, stays for the cover, spring actuated mechanism acting upon said stays to support said cover, and means for supporting said spring actuated mechanism from the motor board free from the sides of the cabinet.

In testimony whereof, we have hereunto subscribed our names in the presence of two subscribing witnesses.

ALFRED BERSTED.
MARTIN BERSTED.

Witnesses:
　CARLTON HILL,
　JAMES M. O'BRIEN.